Oct. 15, 1946.  J. B. KESSEL  2,409,497
JUICE EXTRACTOR
Filed May 17, 1944  2 Sheets-Sheet 1
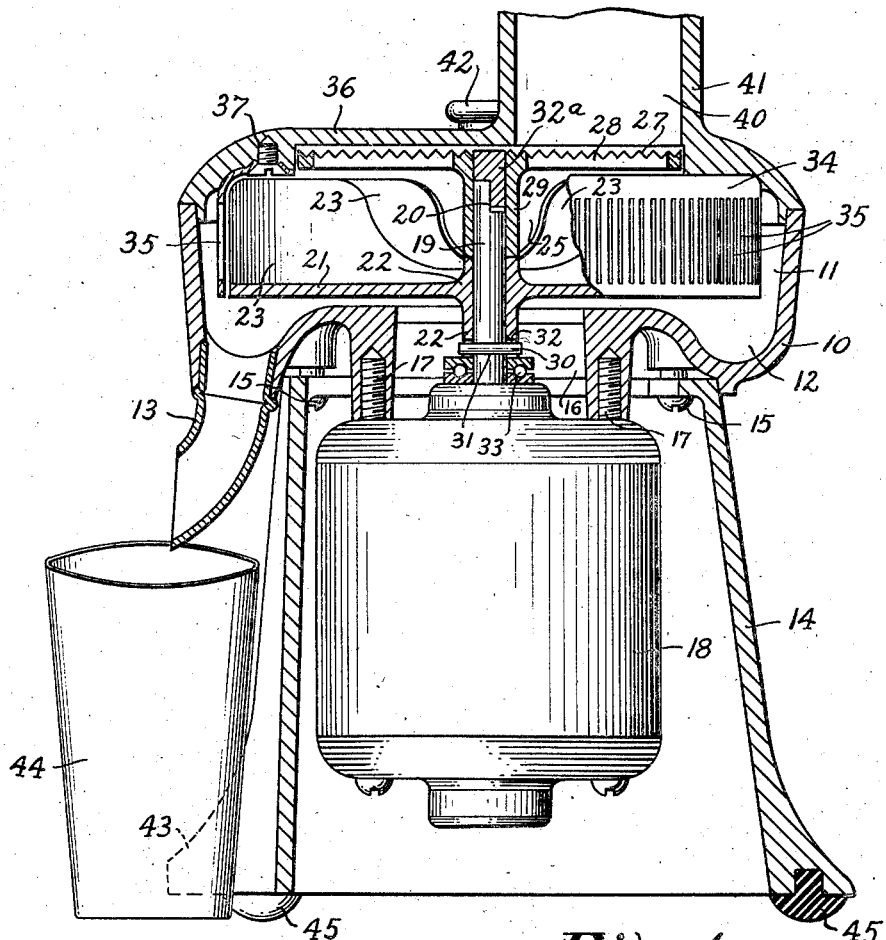
Fig. 1.
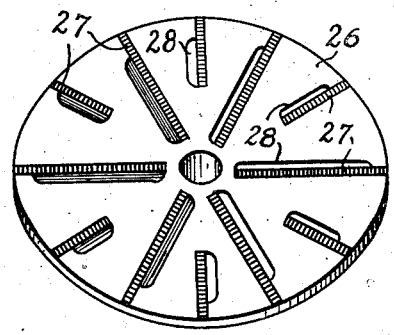
Fig. 2.
INVENTOR
Johannes B. Kessel,
BY 
ATTORNEY INVENTOR
Johannes B. Kessel,
BY
ATTORNEY Patented Oct. 15, 1946

2,409,497

UNITED STATES PATENT OFFICE 2,409,497

JUICE EXTRACTOR

Johannes B. Kessel, Chicago, Ill., assignor to Glendra B. Von Kessel, Chicago, Ill.

Application May 17, 1944, Serial No. 535,953

5 Claims. (Cl. 146—76)

This invention relates to improvements in juice extractors, particularly adapted, though not necessarily limited in use, for extracting juice from fruits and vegetables, and of the type operating to disintegrate the solid portion and render the same into a pulp, after which to separate the juice therefrom.

One of the objects of the invention is to provide an improved extractor of this character, in which there is employed a cutter or grinding element, from which the comminuted or disintegrated material is removed by suction, after which it is subjected to the action of centrifugal force, to separate the liquid therefrom.

A further object is to provide an improved extractor of this character, which will be of a simple and durable construction, and effective and efficient in operation, and to the operating parts of which access may be readily had for cleaning or other purposes, and which parts themselves are readily removable and separable.

To the attainment of these ends and the accomplishment of other new and useful objects as will appear, the invention consists in the features of novelty in substantially the construction, combination and arrangement of the several parts, hereinafter more fully described and claimed, and shown in the accompanying drawings illustrating this invention, in which Fig. 1 is a view, partly in elevation, partly in section, and with parts broken away, of an apparatus of this character, constructed in accordance with the principles of this invention.

Fig. 2 is a detail perspective view of the grinding element.

Figure 3:
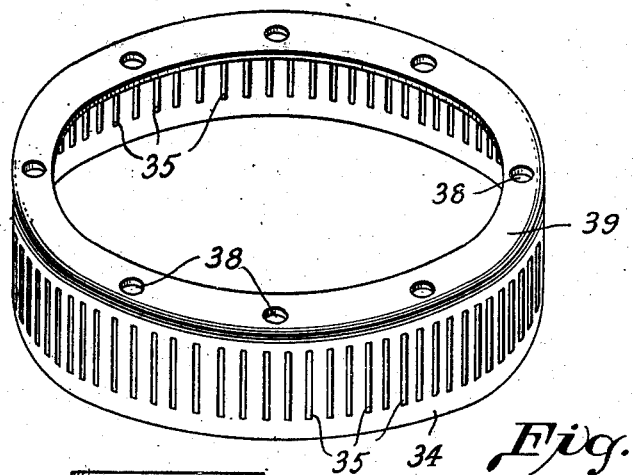
Fig. 3 is a detail perspective view of a cage or housing which constitutes an apertured wall encompassing the separating mechanism.
Figure 4:
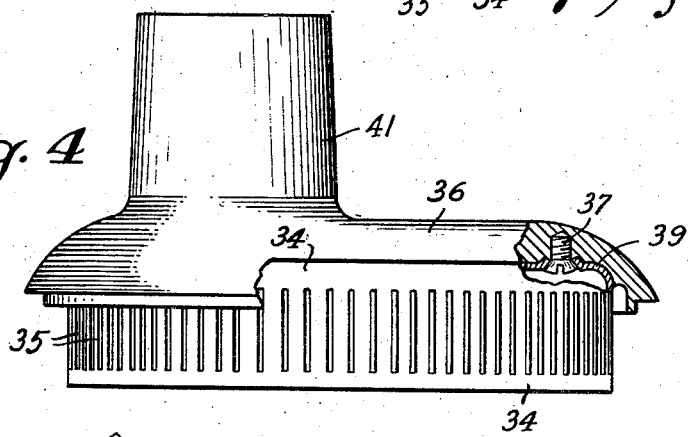
Fig. 4 is a detail view, partly in elevation, partly broken away, and partly in section, of the cover and encompassing apertured wall for the separator.
Figure 5:
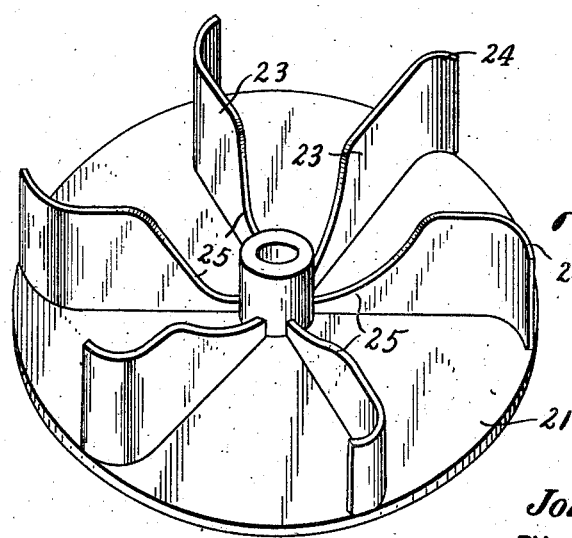
Fig. 5 is a detail perspective view of the combined suction and centrifugal-force-producing device.

The apparatus consists, essentially, of a body member 10, shaped to provide an open chamber 11, a portion of the bottom of which may be depressed, as at 12, to form a trough or portion in which the juice accumulates, and from which chamber the juice may be removed through a suitable discharge outlet 13. The casing thus formed is supported in any suitable manner, preferably by means of a base or support 14, upon which the body member 10 is mounted, and is secured thereto in any suitable manner, such as by means of fastening devices or screws 15.

Extending through the bottom of the casing and out of communication with the trough or depressed portion 12, is an opening 16, and supported by the bottom of the casing in any suitable manner, such as by means of anchoring screws 17, is a motor 18. The shaft 19 of the motor extends into the casing 10 through the opening 16, and, if desired, the extremity of the shaft may be shaped to form a reduced portion irregular in cross-section, for a purpose to be described.

Within the chamber 11 is arranged a suction creating device 21, preferably in the form of a fan, having an apertured hub 22, and provided with blades 23, the outer extremities of which blades terminate adjacent the periphery of the body portion, and are preferably deflected, as at 24, for a purpose to be described. The portions of the blades adjacent the hub 22 may be cut away, as at 25, to encompass the hub, and for the purpose of causing the fan to operate as a suction-creating device.

The numeral 26 designates a cutter or grinding element, which is provided with a series of radially arranged cutting or grinding teeth 27, and adjacent the respective series of teeth are slots or openings 28 that extend through the cutter element 26, so that the material which is ground or disintegrated will pass through the slots or openings 28. This element 26 is provided with a hub 29 depending therefrom.

The element 21 is placed upon the shaft 19 of the motor 18 by sleeving the hub 22 thereover, and when in position, the element 21 may be secured to the shaft for rotation therewith, by means of a pin 30 which passes through an aperture 31 in the shaft, and enters an open recess 32 in the hub 22, thereby locking the element 21 to the shaft, but adapting the same for ready removal therefrom. The grinding or cutting element 26 is then sleeved upon the shaft 19 above the element 21, and the hub 29 of the grinding element will be disposed within the space formed by the cut-away portions of the blades 23, so as to rest upon the hub 22 of the element 21.

The grinding disc may be removably secured to the shaft by means of a suitable fastening device 32a, having a shouldered portion adapted to co-operate with the extremity 20 of the shaft. This fastening device may be connected with the hub of the grinding element in any suitable manner. A bearing 33 may also be provided to encompass the motor shaft and form a support for the elements 21 and 26, to facilitate their rotation.

Encompassing the fan element 21, is a wall 34 having apertures 35 therethrough, and the deflected or curved extremities 24 of the fan blades 23 are disposed in close proximity to the said wall. This wall may be formed integral with the cover, or made separate from the cover 36, and supported in any suitable manner, such as by means of fastening screws 37 which pass through apertures 38 in an inwardly flanged portion 39 of the wall, so that the wall will be removable, and replaceable, with the cover 36. The cover is provided with an opening 40, adjacent which the grinding element 26 is disposed, and across which the cutting or grinding teeth 27 move as the element 26 is rotated. A tubular extension 41 is supported by the cover to encompass the opening 40, so that the article, such as fruit, vegetable, or meat, to be operated upon, may be held against, or presented to, the grinding element.

The cover 36 may be removably held in position in any suitable manner, such as by fastening devices 42 of any construction, and a portion of the base 14 may be shaped, as at 43, so as to position a receptacle 44 beneath the spout 13 to receive the liquid or finely ground matters therefrom.

With this construction, the article is placed in the tubular member 41 and against the cutting element 26, being held in this position in any suitable manner, so that when the grinding element 26 is rotated, the article will be disintegrated or ground to produce a pulp. As the grinding element rotates, the fan element 21 will also rotate and, in so rotating, will create a suction which operates to draw the disintegrated material through the openings 28 in the grinding element, to be delivered to and upon the fan element 21. As the material falls upon the fan element 21, this element will also operate to throw or force the pulp, by centrifugal force, against the wall 34, so as to separate the liquid from the pulp, the liquid passing through the openings or apertures 35 and falling into the trough 12, to be delivered through the spout 13. As the blades 23 of the fan are of a length that the deflected or curved extremities 24 thereof will be disposed in close proximity to the wall 34, and as the wall 34 is stationary, it will be manifest that the extremities 24 of the blades 23 will press the pulp against the wall, and thereby extract any liquid which may remain in the pulp.

With this construction, it will also be manifest that when the cover 36 is removed, the wall 34, being supported thereby, will also be removed, so as to expose the grinding element 26, as well as the fan element 21. These latter two elements are also freely removable from the shaft 19, separately or together, as may be desired, thereby rendering it possible to gain free access to all of the parts for cleaning purposes. If desired, the entire mechanism may be supported by rubber cushions 45 secured to the base or support 14.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A juice extractor embodying a grinding element comprising a disc with adjacent teeth and openings through the disc, means for rotating said element, means for holding an article against said element to produce a pulp therefrom, suction creating means operating upon the pulp to remove it through the openings from said grinding element, a casing for said suction creating means, said casing embodying a fixed apertured wall, against which the pulp is delivered, by centrifugal force, by said suction creating means, and a removable cover for the extractor, to which cover said wall is connected, for removal therewith.

2. A liquid separator embodying a casing, a motor outside of the casing, said motor embodying a shaft extending into the casing, a suction fan removably connected to the shaft to rotate therewith, a grinding disc also connected to said shaft above the suction fan, a removable cover for the casing, said disc having radially extending openings therethrough and teeth extending along the side of each opening, means whereby an article may be held against the grinding disc through the cover, whereby the grinder will produce a pulp therefrom, and an apertured wall encompassing said suction fan, said fan operating to first remove the pulp through said openings from said grinder by suction and subsequently drive the same, by centrifugal force, against said apertured wall to remove liquid from the pulp, said apertured wall being supported by and removable from said casing with said cover.

3. An extractor of the character described, embodying a rotatable grinder element comprising a disc with rows of teeth and a slot adjacent each row of teeth extending through the disc, means whereby an article may be presented to the grinder to be disintegrated thereby, means for drawing the disintegrated mass through the slots from the grinder and operable to subject the mass to the action of centrifugal force, to separate the ingredients of the mass, an apertured wall against which the mass is thrown by said centrifugal force, a casing housing the grinder and said wall, and a removable cover for the casing, said wall being supported by and removable with said cover.

4. An extractor of the character described, embodying a rotatable grinding element comprising a disc with slots therethrough and grinding teeth on the upper side adjacent the slots, means whereby an article may be presented to the grinder to be disintegrated thereby, a suction-creating device disposed below the said element, an apertured wall encompassing said suction device, means for rotating the said element and said suction device, the latter operating to draw through the slots and to receive the disintegrated mass from the grinding element and then operating to drive the mass, by centrifugal force, against said wall, the outer portions of the blades of said suction device being curved rearwardly and operating to press the mass against said wall, a casing for all of the parts, and a removable cover for the casing, through which the article is presented to the grinding element, said apertured wall being supported by and removable with the said cover.

5. An extractor of the character described, embodying a rotatable grinding element comprising a disc with slots therethrough and teeth in the upper surface of the disc adjacent the slots, means whereby an article may be presented to the grinder to be disintegrated thereby, a suction-creating device disposed below the said element, an apertured wall encompassing said suction device, and means for rotating the said element and said suction device, the latter operating to receive the disintegrated mass through the slots from the grinding element and then operating to drive the mass, by centrifugal force, against said wall, the outer portions of the blades of said suction device being curved rearwardly and operating to press the mass against said wall, said grinding element and said suction device being mounted upon the same operating shaft and being independently removable therefrom.

JOHANNES B. KESSEL.